Jan. 28, 1930.　　　S. KARASUDA　　　1,745,220
SIGNALING DEVICE
Filed July 30, 1929　　　2 Sheets-Sheet 1
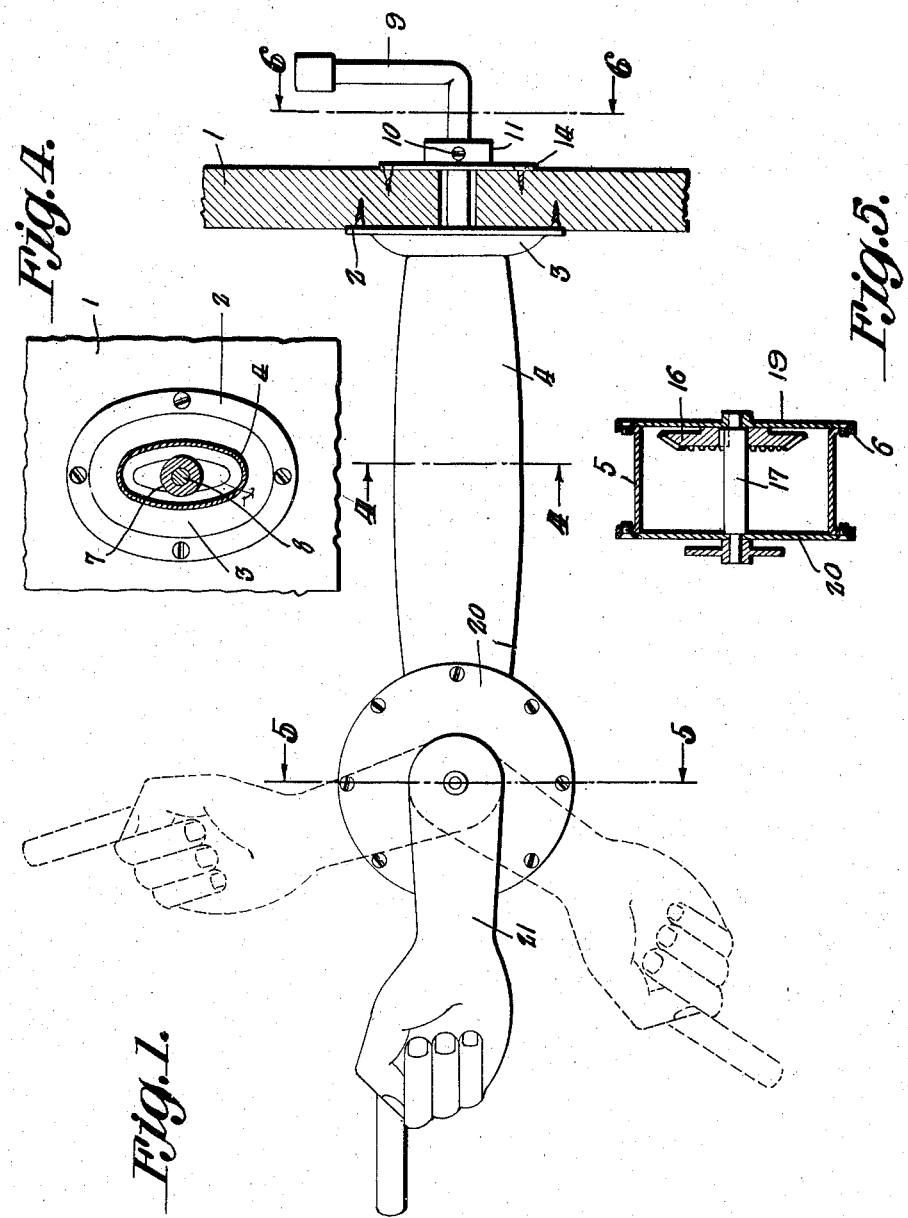

Jan. 28, 1930.  S. KARASUDA  1,745,220
SIGNALING DEVICE
Filed July 30, 1929  2 Sheets-Sheet 2
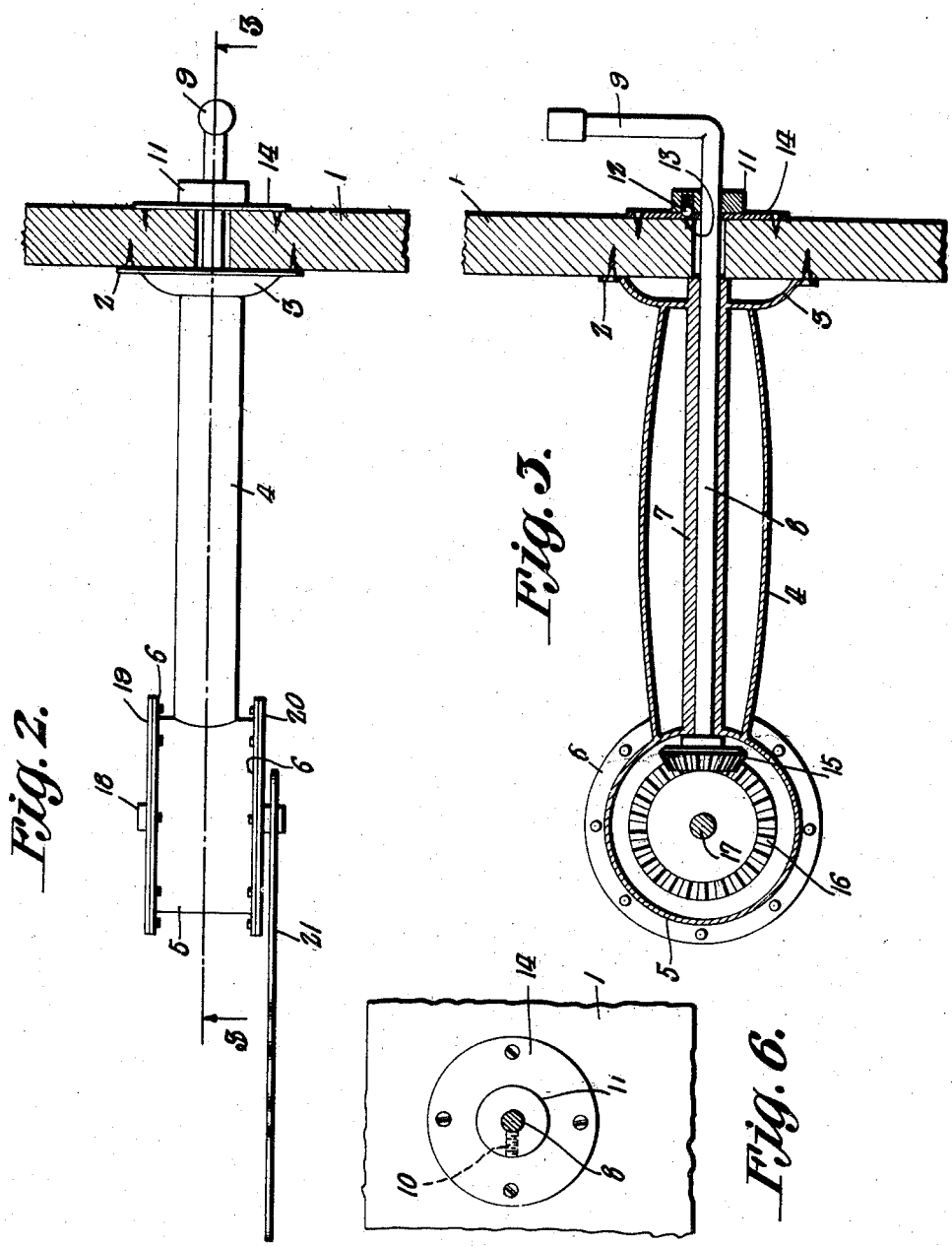
Seisuke Karasuda, INVENTOR.
BY Victor J. Evans
ATTORNEY.

Patented Jan. 28, 1930

1,745,220

UNITED STATES PATENT OFFICE

SEISUKE KARASUDA, OF KAPAA, TERRITORY OF HAWAII

SIGNALING DEVICE

Application filed July 30, 1929. Serial No. 382,195.

My present invention has reference to an improved indicator signal for motor vehicles and has as its primary object to provide a device of this character whereby a driver may readily signal an intention to turn either to the right or to the left or to stop.

A further and important object is the construction of a signal casing which may be cast or otherwise formed of light material, easily attached to the side of an automobile or like vehicle, but strong and sturdy so as to withstand weather conditions to which it is subjected.

A still further object is to provide a directional signal in which a crank or handle turned from the interior of an automobile (in close proximity to the driver for easy operation) will turn to various signaling positions a signal arm in the nature of a hand having its index finger pointed.

To the attainment of the foregoing and other objects which will present themselves as the nature of the invention is better understood the invention consists in the combination, construction and operative association of parts, one satisfactory embodiment of which is disclosed by the accompanying drawings.

In the drawings:

Figure 1 is a side elevation of the improvement, the portion of the vehicle to which it is attached being in section.

Figure 2 is a top plan view thereof.

Figure 3 is a sectional view on the line 3—3 of Figure 2.

Figure 4 is a sectional view on the line 4—4 of Figure 1.

Figure 5 is a sectional view on the line 5—5 of Figure 1.

Figure 6 is a sectional view on the line 6—6 of Figure 1.

A portion of the side frame of a vehicle or the like, in the drawings, is indicated by the numeral 1. Secured to the outer face of the frame member 1 by screws or the like there is the flanged portion 2 of a cup-shaped head 3. The head is constructed of light metal and from the head there extends and there is integrally formed therewith an arm 4 of like metal. The arm 4 is preferably elliptical in cross section as may be the head 3. The arm 4 is cast with a cylindrical casing 5, the latter having its edges, at its open sides provided with outstanding continuous flanges 6. There is cast with the inner face of the casing 5 and arranged centrally with respect to the arm 4 and likewise passing through the portion of the head 3 that is received in the arm 4 a somewhat thickened tubular member 7. The inner end of the tube is designed to contact with the outer face of the frame 1 as disclosed by Figure 2 of the drawings and the tube 7 provides an elongated bearing for a shaft 8 that has a portion passing through an opening in the frame 1. The inner end of the shaft is offset to provide the same with a crank handle 9. There is removably fixed on the shaft by means 10 a solid sleeve 11 provided with a pocket for the reception of a spring influenced detent 12, the same being preferably in the nature of a small sphere and this sphere is designed to be received in one of three spaced depressions 13 in a disc 14 that is fixed on the inner face of the frame member 1 and through which the shaft passes.

The end of the shaft that is received in the casing 5 has removably fixed thereon a pinion 15. This pinion is designed to mesh with a gear 16, the said gear being fixed on a shaft 17. The shaft 17 has one of its ends received in a bearing 18 in a disc 19 that forms one of the sides or heads for the casing 5, the disc being screwed or bolted to the flange 6. The shaft also passes through a bearing in a second disc 20 removably fixed to the second flange 6 of the casing and on the end of the shaft that exetends through this bearing there is fixedly secured a signal arm 21. The arm is shaped to represent the wrist and hand portion of a human being, the index finger of the hand being extended.

The crank or handle 9 is in close proximity to the driver of the machine and if desired the disc or plate 14 as well as the collar 11 may have lines or other identification marks therein which correspond with the position of the detent 12 and the three spaced depressions 13. By turning the shaft 8 to swing the signal 21 downwardly the signal will indicate to traffic that the vehicle is to stop. By turning the shaft to bring the signal arm to the full line position in Figure 1 the said signal indicates that the vehicle is to turn to the left, while by further turning the shaft to turn the signal arm to its upper angle position (as disclosed by the dotted lines in Figure 1) indication is given that the vehicle is to turn to the right. When the signal arm drops to pendent position or at a downward right angle with respect to the casing no signal is indicated except to show traffic that the vehicle is taking its regular straight course.

The simplicity of the construction and the advantages thereof will, it is thought, be understood and appreciated by those skilled in the art to which such invention relates so that further detailed description will not be required.

Having described the invention, I claim:

An indicator for automobiles or like vehicles, including a casing that comprises a cup-shaped head having an outwardly extending flange that is designed to be secured to the outer face of the side frame of a vehicle, a holow arm extending from the head, a cylindrical casing formed on the outer end of the arm, a tubular member formed on the inner face of the casing extending centrally through the arm and through the head and terminating in a line with the flange of the head, said tube providing a bearing for a shaft which has an inner cranked end, and a pinion on its outer end that is received in the casing, discs removably closing the open sides of the casing, a shaft arranged transversely in the casing, and journaled in the discs, a toothed wheel on the shaft in mesh with the pinion, a signal arm on one end of the shaft, a sleeve fixed on the shaft having a pocket for a spring influenced detent, a plate through which the shaft passes and which is fixed to the inner face of the vehicle body and having spaced depressions in the outer face thereof for the reception of the detent when the shaft is turned.

In testimony whereof I affix my signature.

SEISUKE KARASUDA.